United States Patent
Bermel et al.

(10) Patent No.: US 11,295,192 B1
(45) Date of Patent: Apr. 5, 2022

(54) DESTRUCTIBLE RFID TAG

(71) Applicants: Kyle Bermel, Clear Lake, IA (US);
Colynn Black, Mason City, IA (US);
Mark Maliszewski, Osage, IA (US);
Joshua Martinson, Mason City, IA (US)

(72) Inventors: Kyle Bermel, Clear Lake, IA (US);
Colynn Black, Mason City, IA (US);
Mark Maliszewski, Osage, IA (US);
Joshua Martinson, Mason City, IA (US)

(73) Assignee: METALCRAFT, INC., Mason City, IA (US)

( * ) Notice: Subject to any disclaimer, the term of this patent is extended or adjusted under 35 U.S.C. 154(b) by 12 days.

(21) Appl. No.: 16/923,871

(22) Filed: Jul. 8, 2020

(51) Int. Cl.
*G06K 19/077* (2006.01)

(52) U.S. Cl.
CPC . *G06K 19/07777* (2013.01); *G06K 19/07788* (2013.01)

(58) Field of Classification Search
CPC ......... G06K 19/0739; G06K 19/07749; G06K 19/0775; G06K 19/07758; G06K 19/0776; G06K 19/07773; G06K 19/07775; G06K 19/07777; G06K 19/07779; G06K 19/07788; G06K 19/07798; G06K 19/07767; G06K 19/07794
See application file for complete search history.

(56) References Cited

U.S. PATENT DOCUMENTS

| | | | |
|---|---|---|---|
| 9,978,012 B2 | 5/2018 | Mullis et al. | |
| 2003/0031819 A1* | 2/2003 | Adams | G08B 13/2417 428/40.1 |
| 2007/0029384 A1* | 2/2007 | Atherton | G08B 13/2437 235/435 |
| 2016/0353619 A1* | 12/2016 | Kato | G09F 3/00 |

* cited by examiner

*Primary Examiner* — Thien M Le
*Assistant Examiner* — April A Taylor
(74) *Attorney, Agent, or Firm* — David M. Breiner; BrownWinick Law Firm

(57) ABSTRACT

Disclosed is a destructible RFID Tag that may include a far field antenna, a near field loop having an RFID chip, and an attachment adhesive configured to bond the destructible RFID Tag to an object. In at least one nonlimiting example embodiment the far field antenna and the near field loop are inductively coupled in a manner that allows the near field loop to send a long distance signal via the far field loop, and wherein the destructible RFID Tag destructs when the destructible RFID Tag is removed from an object after the attachment adhesive is bonded to the object.

12 Claims, 3 Drawing Sheets

DESTRUCTIBLE RFID TAG

BACKGROUND

1. Field

Example embodiments relate to a destructible RFID tag and a method of using the tag.

2. Description of the Related Art

Radio Frequency Identification (RFID) systems use RFID tags and readers to remotely store and retrieve data used in a variety of systems. An RFID tag is an object that can be applied to or incorporated into a variety of products, packaging, identification mechanism, etc. for the purpose of identification and tracking using radio waves. For example, in one embodiment, RFID tags may be applied to a car whose owner has subscribed to a car washing service. In this example, the owner of the car may drive his car to a car wash service which has a reader that reads the RFID tag and uses this information to authorize a car wash.

SUMMARY

While RFID tags have a wide array of uses, the inventor has noticed RFID tags, themselves, may be misused. For example, in the car wash example, the owner of the car wash service may expect that that the RFID tag be associated with one car only. In the event the owner of the car owns two cars, there is a possibility the owner of the cars may, instead of purchasing two RFID tags, may simply remove an RFID tag from one car and install it on the other thereby avoiding the cost of having to purchase two RFID tags, at the expense of the owner of the car wash. To compensate for this problem, the inventor designed an RFID tag which is destructible making it virtually impossible for one person to remove the RFID tag, after it has been attached, and thereafter reuse the RFID tag. As applied to the above example, this prevents the owner of two cars from removing a RFID tag from one car and reusing it to wash a second car. While the RFID tag thus described is certainly usable in the car wash industry, it has a wide array of uses across a wide array of industries and should not be limited thereto.

In accordance with example embodiments, a destructible RFID Tag may include a far field antenna, a near field loop having an RFID chip, and an attachment adhesive configured to bond the destructible RFID Tag to an object, wherein the far field antenna and the near field loop are inductively coupled in a manner that allows the near field loop to send a long distance signal via the far field loop, and wherein the destructible RFID Tag destructs when the destructible RFID Tag is removed from an object after the attachment adhesive is bonded to the object.

In accordance with another example embodiment, a destructible RFID Tag may include a far field antenna, a near field loop having an RFID chip, and an attachment adhesive configured to bond the destructible RFID Tag to an object, wherein the far field antenna and the near field loop are inductively coupled in a manner that allows the near field loop to send a long distance signal via the far field loop, and wherein far field antenna and the near field loop separate after the attachment adhesive is bonded to the object and the destructible RFID Tag is removed from the object.

Disclosed also is a destructible RFID Tag, comprising a label, an antenna module, an RFID module, and an attachment adhesive, wherein a bond between the RFID module and the attachment adhesive is stronger than a bond between the RFID module and the antenna module.

BRIEF DESCRIPTION OF THE DRAWINGS

Example embodiments are described in detail below with reference to the attached drawing figures, wherein.

DETAILED DESCRIPTION

Figure 1:
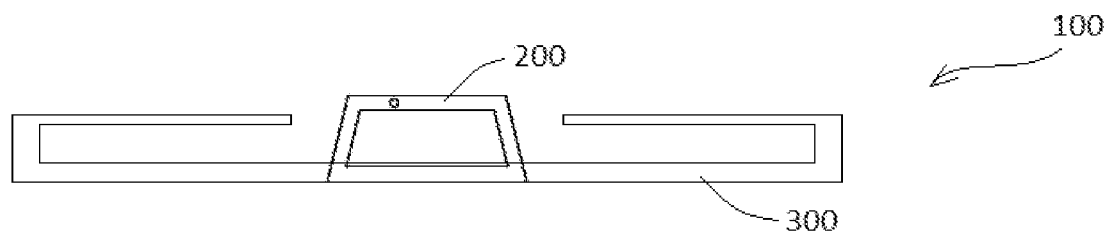
FIG. 1 is a view of a destructible tag in accordance with example embodiments.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to an RFID tag and systems and methods of using the RFID tag.

FIG. 1 is a view of an RFID tag 100 in accordance with example embodiments. As shown in FIG. 1, the RFID tag 100 includes a near field loop 200 on a far field RFID antenna 300. The near field loop 200 and the far field loop 300 are inductively coupled in a manner that allows the near field loop 200 to send a long distance signal via the far field loop 300. It also allows the near field loop 200 to receive a signal from a transmitter arranged at a relatively long distance from the near field loop 200. In at least one nonlimiting example embodiment, the near field loop 200 includes an RFID chip which may be configured to receive a signal, process the signal, and send a signal via the far field loop 300.

Figure 2:
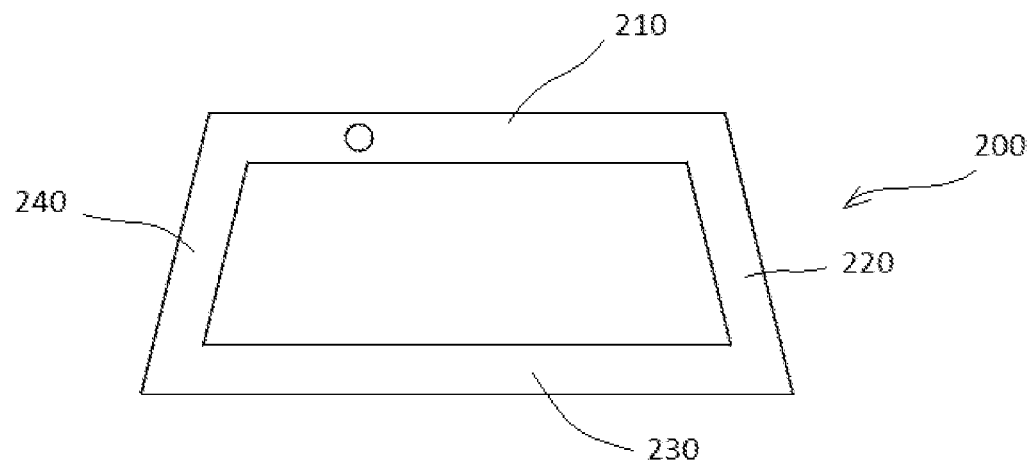
FIG. 2 is a view of a near field loop in accordance with example embodiments.

In example embodiments, the near field loop 200 may be made by forming a conductive pattern (loop) on a destructible material, for example, paper, vinyl, or anything that breaks relatively easily. In the nonlimiting example of FIG. 1, and referring to FIG. 2, the near field loop 200 may resemble a trapezoid, for example, an isosceles trapezoid, having a first leg 210, a second leg 220, a third leg 230, and a fourth leg 240. As shown in FIG. 2, the first and third legs 210 and 230 may be substantially parallel whereas the second and fourth legs 220 and 240 are inclined with respect to one another. It is understood that the particular example shown in the figures is for the purpose of illustration only as the near field loop 200 may be constructed to have a different geometry and therefore a different shape. For example, in other nonlimiting example embodiments, the near field loop 200 may resemble a square, a rectangle, a circle, or an ellipse.

Figure 3:
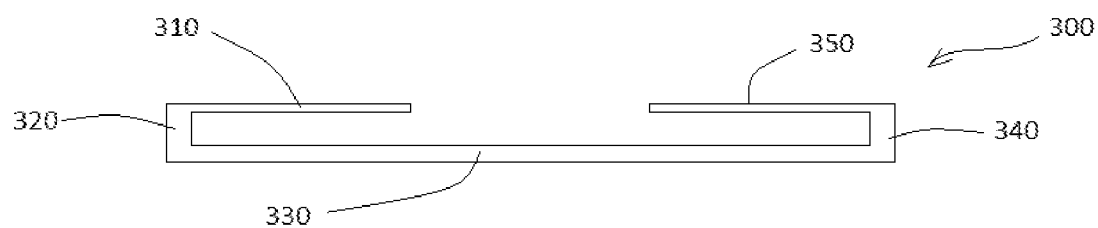
FIG. 3 is view of a far field RFID antenna in accordance with example embodiments.

In example embodiments the far field loop 300 may be fabricated forming a conductive material on a conventional material, for example, polyester. In the nonlimiting example of FIG. 1, and referring to FIG. 3, the far field loop 300 may resemble a C-shaped antenna. For example, the far field loop 300 may have a first leg 310, a second leg 320, a third leg 330, a fourth leg 340, and a fifth leg 350. In example embodiments, each of the first leg 310, the second leg 320, the third leg 330, the fourth leg 340, and the fifth leg 350 may resemble rectangles, some of which are parallel to each other, others of which are perpendicular. For example, the first leg 310 and the second leg 320 may be perpendicular to each other and the second leg 320 and the third leg 330 may also be perpendicular to each other such that the first leg 310 and the third leg 330 are parallel to each other. Similarly, fifth leg 350 and the fourth leg 340 may be perpendicular to each other and the fourth leg 340 may be perpendicular to the third leg 330 so that the fifth leg 350 and the third leg 330 may be parallel to each other. In example embodiments, the lengths of the second leg 320 and the fourth leg 340 may be substantially the same, and the length of the third leg 330 may be greater than the sum of the lengths of the first and fifth legs 310 and 350 such that there is a gap between ends of the first let 310 and the fifth leg 350. As one skilled in the art would easily recognize, the example far field loop 300 illustrated in the figures is for the purpose of illustration only and is not intended to limit the invention as the far field loop 300 may be configured to have a different geometry.

In example embodiments, the near field loop 200 may or may not be attached to the far field antenna 300. While it is preferable that the near field loop 200 is not attached to the far field antenna 300, a very weak adhesive, may be applied to bond to the two loops 200 and 300 together. It is also possible the two loops 200 and 300 may be attached to one another by another very weak means, for example, by crimping.

Figure 4:
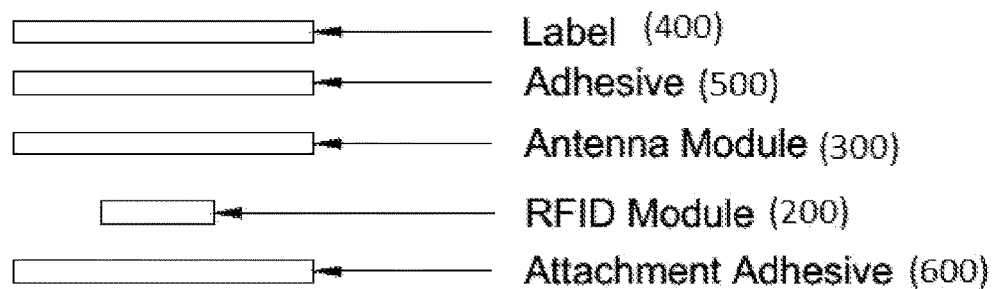
FIG. 4 is a view of a is a view of a destructible tag in accordance with example embodiments.

FIG. 4 is a view of a RFID Tag 100 showing the arrangement of various elements. As shown in FIG. 4, the RFID Tag 100 includes the near field loop 200 and the far field antenna 300. As also shown in FIG. 4, the RFID Tag 100 may further include a label 400, an adhesive 500, and an attachment adhesive 600. In example embodiments, the far field antenna 300 may be bonded to the label 400 via the adhesive 500, which may be an acrylic adhesive or some other similar adhesive. Adhesive 500 may also be an attachment, transfer, or construction adhesive. The near field loop 200 may be placed on the far field antenna 300 but not attached thereto by an adhesive or other mechanical means. In another embodiment, a very weak adhesive may be applied to weakly bond the near field loop 200 and the far field antenna 300. In yet another embodiment, the near field loop 200 and the far field antenna 300 are attached via a weak means, such as crimping. An attachment adhesive 600, which may be on a release liner (not shown), may be applied on each of the near field loop 200 and the far field antenna 300. This adhesive 600 may temporarily attach the near field loop 200 to the far field antenna 300 in a very weak manner. Adhesive 600 may also be an acrylic adhesive, an attachment adhesive, a transfer adhesive, or a construction adhesive.

In example embodiments, the above described RFID Tag 100 has a very weak to no bond between the near field loop 200 and the far field antenna 300. Thus, the RFID Tag 100 is prone to breaking which is highly desirable in some circumstances. For example, when the RFID Tag 100 is attached to an object, for example, a container, a car, or a badge, and someone attempts to remove the RFID Tag 100 from the object to use it with some other object, the force involved with removing the RFID Tag 100 would end up separating the near field loop 200 from the far field antenna 300 thus ruining the RFID Tag 100. As another example, because the near field loop 200 is constructed on a destructible material, the material itself could be destroyed thus destroying the near field loop 20 rendering the RFID Tag 100 unusable. However, even if the near field loop 200 is not destroyed, in the embodiment where there is nothing attaching the near field loop 200 to the far field antenna 300, the near field loop 200 would simply disassociate from the far field antenna 300 thus rendering the RFID Tag 100 unusable. In another embodiment, where the near field loop 200 is weakly connected to the far field antenna 300 (for example, where the connecting means has a strength less than the strength of the attachment adhesive 600 connecting the near field loop 200 to the object), removing the RFID Tag 100 from the object would cause the near field loop 200 to separate from the far field antenna 300 thereby rendering the RFID Tag 100 unusable.

Figure 5:
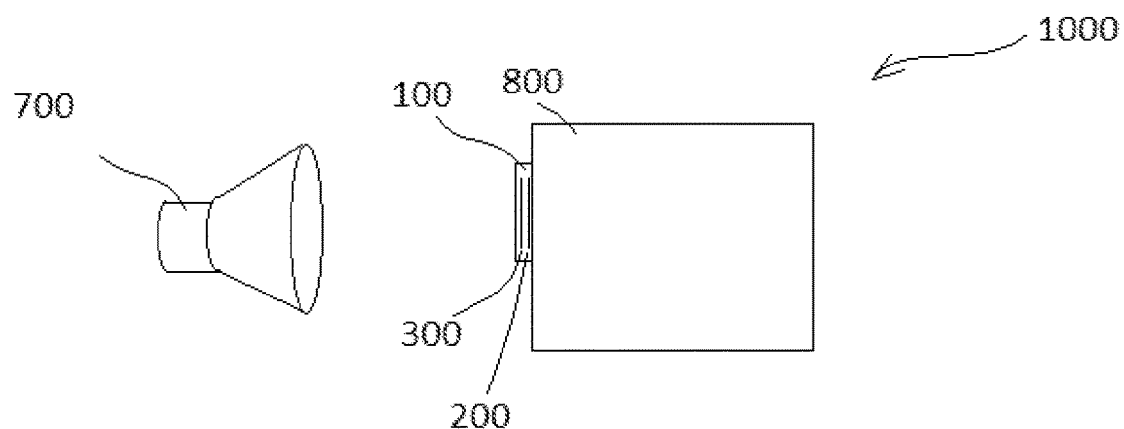
FIG. 5 is a view of a system in accordance with example embodiments.
Figure 6:
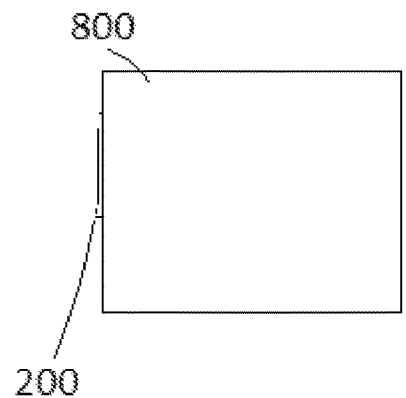
FIG. 6 is a view of a system in accordance with example embodiments.

FIG. 5 is a view of a system 1000 in accordance with example embodiments. As shown in FIG. 5, the system includes an RFID Reader 700 and the RFID Tag 100. In FIG. 5 a user may place the RFID Tag 100 on the surface of an object 800 by removing a release liner of the RFID Tag 100 and placing the RFID Tag 100 on the object 800. In the nonlimiting example embodiment of FIG. 5, the RFID Reader 700 may send a signal to RFID Tag 100 and the signal may be picked up by the far field antenna 300 and transmitted to the near field loop 200 via inductive coupling. The RFID Tag 100 may, thereafter, send a return signal which may include information such as tag identification information or even information regarding the object or the contents thereof. Regardless, in the event someone were to try to remove the RFID Tag 100 from the object 800, removal may destroy the near field loop 200 since it is formed on a destructible material, or may separate the far field antenna 300 from the near field loop 200 as shown in FIG. 6, which also renders the RFID Tag 100 unusable.

Although the usefulness of RFID Tag 100 is readily apparent, for purposes of illustration, the following use case is described. In this example an owner of a car wash hands out RFID Tags 100 to customers. Each RFID Tag 100 is associated with a single car. An owner of a car would thereafter attach the RFID Tag 100 to their car. The car wash would be initiated as the owner of the car drives their car to the car wash which has an RFID reader to detect whether the car is authorized to be washed. If the owner of the car tried to use their RFID Tag 100 on another car, by removing the RFID Tag 100, the RFID Tag 100 would be destroyed thus preventing the owner of the car from using the RFID Tag 100 for multiple cars.

In example embodiments, RFID Tag 100 may be made in various ways. For example, in one nonlimiting example embodiment, the near field loop 200 may be fabricated as a conductive layer on a destructible material as described earlier and this combination may be referred to as an RFID Module. An antenna module may thereafter be constructed by forming a conductive layer on a substrate to form the far field antenna 300. In example embodiments, a label layer 400 may be bonded to the substrate bearing the far field antenna 300 via an adhesive 500. Thereafter, the RFID Module 200 may be placed on the antenna module 300 in such a manner that the near field loop 200 and the far field antenna 300 are inductively coupled. This step may or may not include a weak adhesive to attach the RFID Module 200 to the Antenna Module 300. Regardless, an attachment adhesive 600 may thereafter be applied to each of the RFID Module 200 and the Antenna Module 300 to hold these modules in place. In this example embodiment, because there may be no adhesive between the RFID module 200 and the Antenna Module 300, the RFID module 200 and the Antenna module 300 may not be directly attached to each other and may only be indirectly attached to each other via the attachment adhesive 600. That is, while it is possible the RFID Module 200 contacts the Antenna Module 300, this contact should not be construed as physically connecting the two modules together as neither may be bonded to the other via an adhesive or connecting means.

Figure 7:
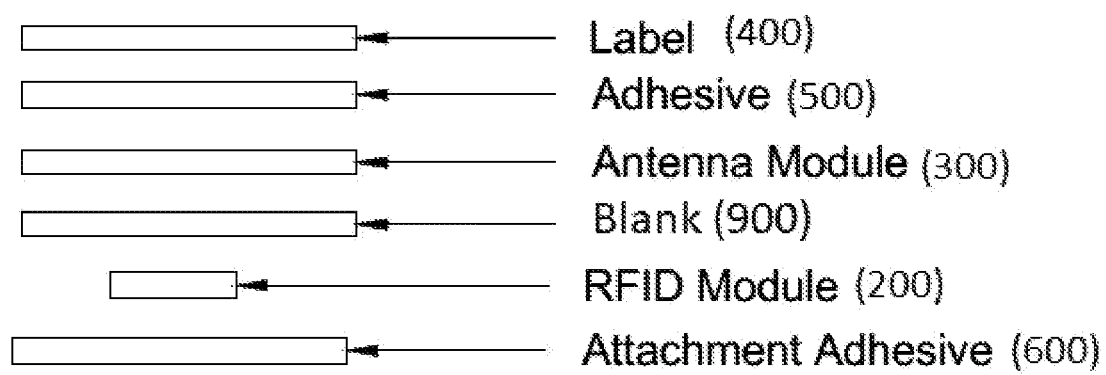
FIG. 7 is a view of a is a view of a destructible tag in accordance with example embodiments.

It is understood that the inventive concepts are not to be strictly limited by the above examples. For example, in FIG. 7 a destructible tag is shown which is nearly identical to the previously described tags except the destructible tag of FIG. 7 includes a blank or print layer between the RFID module 200 and the Antenna module 300.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A destructible RFID Tag, comprising:
   a far field antenna;
   a near field loop having an RFID chip; and
   an attachment adhesive configured to bond the destructible RFID Tag to an object, wherein the far field antenna and the near field loop are inductively coupled in a manner that allows the near field loop to send a long distance signal via the far field antenna, the near field loop has a first side facing the far field antenna and a second side opposite the first side, the attachment adhesive is on the second side of the near field loop, and wherein the destructible RFID Tag destructs when the destructible RFID Tag is removed from the object after the attachment adhesive is bonded to the object.

2. The destructible RFID Tag of claim 1, wherein the near field loop is comprised of a destructible material.

3. The destructible RFID Tag of claim 2, wherein the destructible material is comprised of at least one of paper and vinyl.

4. The destructible RFID Tag of claim 1, wherein the near field loop is configured to break when the RFID Tag is removed from the object.

5. The destructible RFID Tag of claim 1, wherein the far field antenna and the near field loop 200 are configured to separate when the RFID Tag is removed from the object.

6. The destructible RFID Tag of claim 1, wherein the attachment adhesive is applied over the far field antenna and the near field loop to maintain a relative position of the far field antenna with the near field loop before the destructible RFID Tag is attached to the object.

7. The destructible RFID Tag of claim 1, wherein there is no adhesive between the near field loop and the far field antenna.

8. A method of making a destructible RFID Tag, comprising:
   forming an antenna module comprised of a label and an antenna bonded to the label with an adhesive;
   forming an RFID module by forming an antenna on destructible material;
   applying an attachment adhesive to the antenna module and the RFID module to maintain a position of the RFID module with the antenna module, the attachment adhesive being applied to a side of the RFID module facing away from the antenna module.

9. The method of claim 8, wherein the destructible material is paper.

10. The method of claim 8, wherein the destructible material is vinyl.

11. The method of claim 8, wherein the antenna module includes polyester.

12. The method of claim 8, further comprising:
    arranging the RFID module on the antenna module to form an inductive coupling.

* * * * *